T. C. LUCE.
AUTOMOBILE SHOCK ABSORBER AND STABILIZER.
APPLICATION FILED DEC. 11, 1918.
1,418,813.
Patented June 6, 1922.
2 SHEETS—SHEET 1.
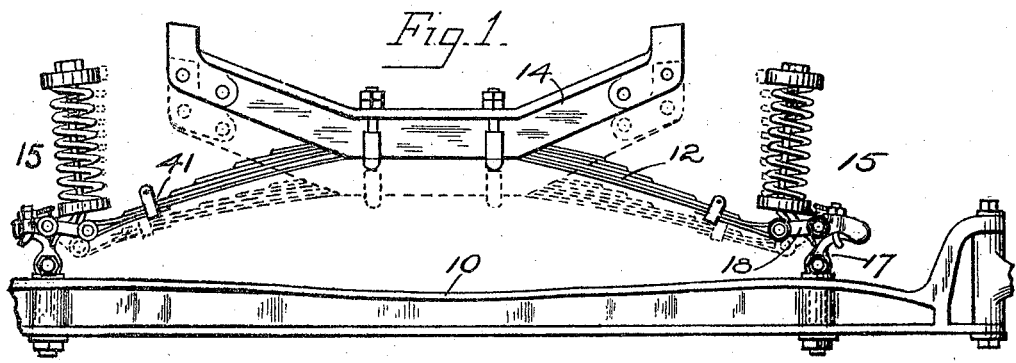
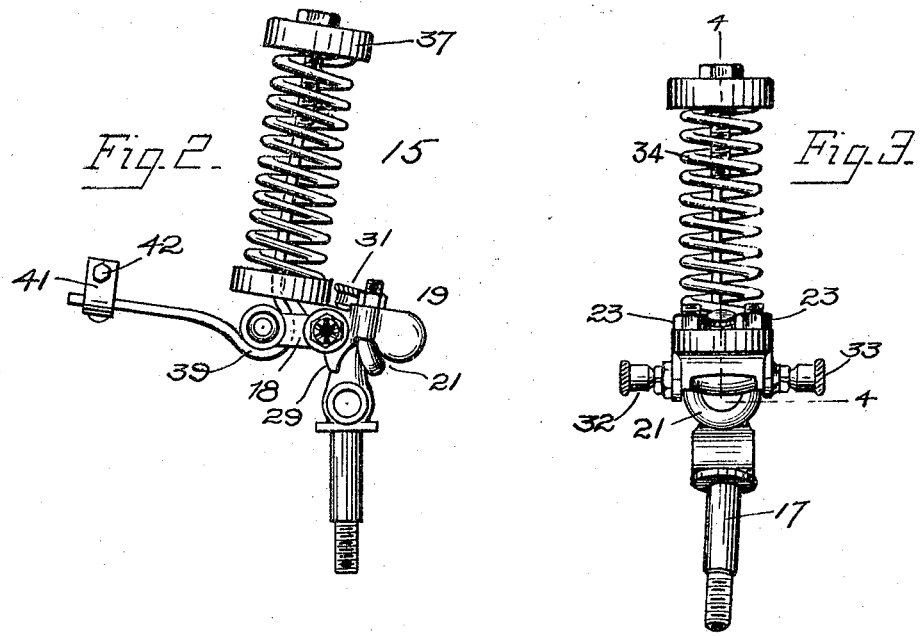
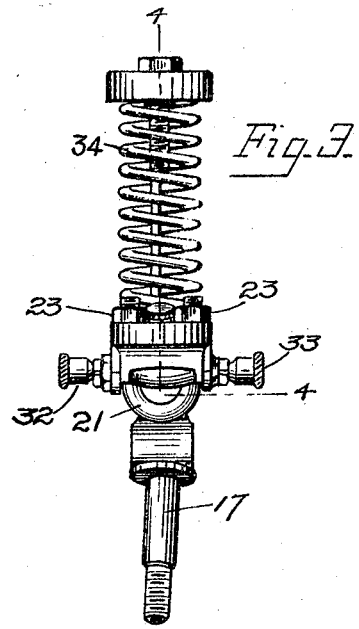
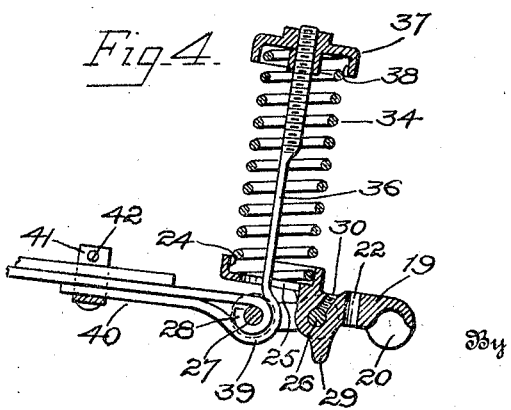
Inventor
Thomas C. Luce
By Henry C. Rockwell
Attorney T. C. LUCE.
AUTOMOBILE SHOCK ABSORBER AND STABILIZER.
APPLICATION FILED DEC. 11, 1918.
1,418,813. Patented June 6, 1922.
2 SHEETS—SHEET 2.
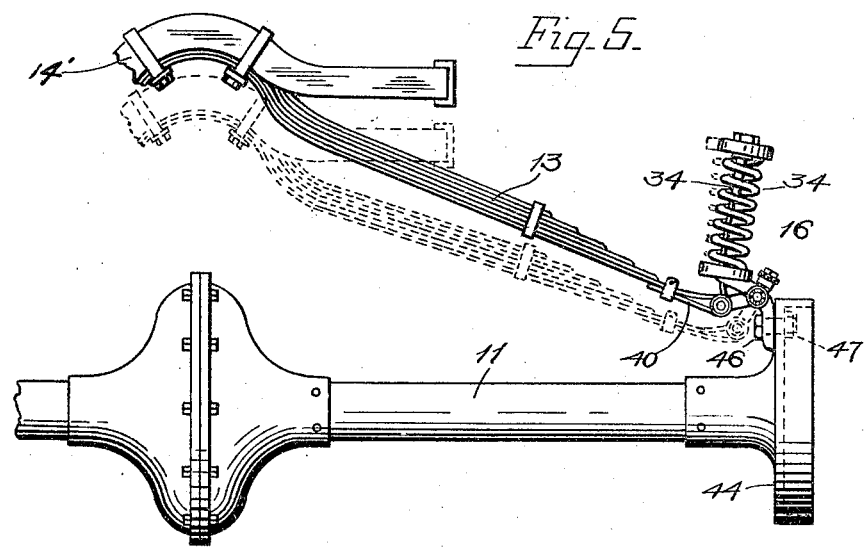
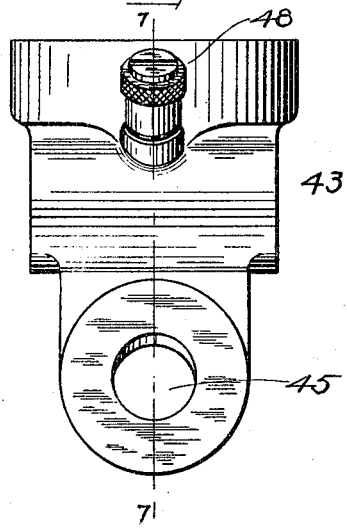
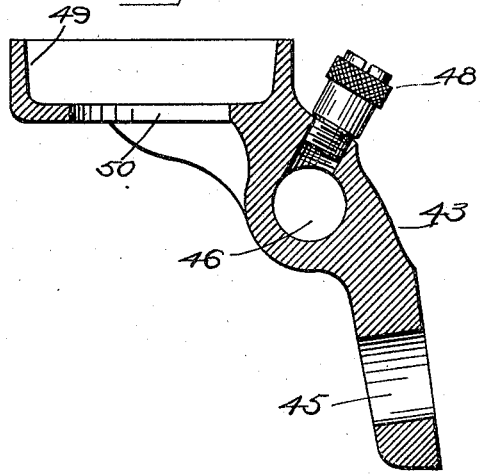
Inventor
Thomas C. Luce
By Henry E. Rockwell
Attorney

UNITED STATES PATENT OFFICE.

THOMAS C. LUCE, OF STRATFORD, CONNECTICUT.

AUTOMOBILE SHOCK ABSORBER AND STABILIZER.

1,418,813.     Specification of Letters Patent.      Patented June 6, 1922.

Application filed December 11, 1918. Serial No. 266,271.

*To all whom it may conern:*

Be it known that I, THOMAS C. LUCE, a citizen of the United States, residing in the town of Stratford, county of Fairfield, and State of Connecticut, have invented certain new and useful Improvements in an Automobile Shock Absorber and Stabilizer, of which the following is a full, clear, and exact description.

This invention relates to a shock absorber for vehicles, and more particularly to an automobile shock absorber and stabilizer, which is designed to be mounted upon the Ford automobile, although it will be apparent that my invention is not necessarily limited in its use to a particular type of automobile.

It is well known that when the Ford automobile is driven relatively fast, for example at a speed in excess of twenty or twenty-five miles an hour, that a very appreciable vibration and side swaying is produced, this side swaying is much more noticeable in the Ford automobile than in larger and heavier automobiles, and it is very largely due to the construction of the springs used on the Ford automobile and the means provided for supporting the ends of these springs upon the front and rear axles. The connecting means which are particularly responsible for this side swaying are the shackles or links which connect the ends of the front and rear springs to the brackets carried by the front and rear axles. These shackles are connected to the supporting brackets in such a manner that they permit the leaf springs and the automobile body carried thereby to swing or sway back and forth in a lateral direction, that is in a direction longitudinal of the front and rear axles.

One object of my invention is to provide a shock absorber and stabilizer which is so constructed, that it will, to a large extent, prevent the objectionable side swaying, above referred to, of the springs of the Ford automobile relatively to its axles.

Another object of my invention is to provide a shock absorber which is simple in construction, consists of but few parts, which may be easily and quickly adjusted to accommodate the weight of the particular car upon which it is mounted, and which materially reduces the jolting and jarring of the automobile body which is supported by the same.

Another object of my invention is to provide a shock absorber which will materially reduce the rebound or upward movement of the springs of the automobile caused by jolting the automobile.

Still another object of my invention is to provide a shock absorber for a Ford automobile which is constructed to be secured to the standard Ford equipment for supporting a leaf spring upon its axle, in order to utilize these elements of the standard equipment and thereby avoid the expense and labor of producing a shock absorber with these additional elements.

To these and other ends the invention consists in the novel features and combinations of parts to be hereinafter described and claimed.

In the accompanying drawings,

Fig. 1 is a fragmentary front view of a Ford automobile having my shock absorber and stabilizer mounted upon the same.

Fig. 2 is an enlarged side view of my invention shown removed from the automobile upon which it is to be used.

Fig. 3 is a front view of the device shown in Fig. 2.

Fig. 4 is a section on line 4—4 of Fig. 3.

Fig. 5 is a fragmentary rear view of a Ford automobile showing a slight modification of my shock absorber applied thereto.

Fig. 6 is a full size front view of the supporting bracket for the rear shock absorber; and Fig. 7 is a sectional view on line 7—7 of Fig. 6.

In the drawings, I have illustrated my invention as applied to the front and rear axles of the type of Ford automobile now in general use. The front axle of this automobile being designated in its entirety by the numeral 10, the rear axle by the numeral 11, the front leaf spring by the numeral 12, the rear leaf spring by 13, the front frame member by 14, and the rear frame member by the numeral 14'. These elements are all well known and since they form no part of my invention need not be further herein described.

I preferably provide one type of shock absorber, which I have designated in its entirety by the numeral 15 for supporting the opposite ends of the front leaf spring 12 upon its axle, and a slightly modified shock absorber which I designate in its entirety by the numeral 16 for supporting the rear spring 13 upon its axle. The difference in these two shock absorbers 15 and 16, however, resides simply in the means for supporting the same upon its axle, as will hereinafter be pointed out, and not in the construction or operation of the shock absorber in itself.

The Ford automobiles now in general use are provided with a bracket or perch 17, and with a shackle 18, for connecting each end of the front spring 12 to the upper curved end of the perch 17. This perch, which is a part of the standard equipment of the Ford automobile, is normally positioned upon the front axle, with the upper rounded end of the same pointing inward towards the opposite perch, so that when one end of the shackles 18 are connected to the upper end of these perches and the other end of the shackles are connected to the ends of the spring 12, these shackles normally lie in substantially a vertical position and thereby permit the objectionable side swaying of the spring 12, above mentioned. I have found that this side swaying may be prevented to a large extent by mounting the shackles 18 so that when one end of the same is connected to the supporting bracket, and the other end is connected to the spring, they will lie substantially in a horizontal plane, as shown in Fig. 1 of the drawing. In order to support these shackles 18, so that they will normally lie in substantially a horizontal plane, it is necessary to increase the distance between that portion of the brackets and the ends of the spring 12 to which the shackles are secured, as will be apparent. I accomplish this object by interchanging the right and left hand perches 17, that is, the right hand perch is mounted in the left hand socket and vice versa, so that the upper curved ends of these perches point in an outward direction instead of in an inward direction, as customary. Upon the upper curved ends of the perches 17, I mount a bracket 19, a portion of which is cut away as shown at 20 in order to form a socket to receive the upper rounded end of the perch, and the bracket 19 is rigidly clamped to the upper end of the perch 17 by means of the U-shaped clamp 21, the legs of which extend through spaced drill holes 22 formed through the bracket 19 and these legs are threaded to receive nuts 23 to rigidly clamp the bracket 19 in place upon its perch. The bracket 19 is further provided with a cup-shaped portion 24, adapted to have a coiled spring, hereinafter described, seated therein. This cup-shaped portion has a relatively large opening 25 formed in the bottom of the same for a purpose hereinafter described. The intermediate portion of the bracket 19 has a transverse drill hole formed therethrough, which is adapted to receive a bolt 26 of the shackle 18 and the other bolt 27 of this shackle is inserted through the looped end portion 28 of the leaf spring 12, (see particularly Fig. 4). The bracket 19 is further provided with a downwardly projecting lug 29, which partially surrounds the curved portion of the perch 17 and thereby forms a better seat for this bracket upon its perch. A threaded drill hole 30 is preferably formed in the bracket 19 adapted to receive the oil cup 31 in order to lubricate the bolt 26. The Ford shackle 18 now in general use is commonly provided with an oil cup 32 for lubricating the bolt 26 of this shackle and with a second oil cup 33 for lubricating the bolt 27. Upon the seat 24, above mentioned, of the bracket 19, is mounted a coiled spring 34 and extending downwardly through the opening 25 formed in this bracket and through the coiled spring 34, is provided a threaded shaft 36, and upon the upper end of this shaft is mounted a cap 37 having a cup construction 38 in which the upper end of the spring 34 is seated. This cap has threaded engagement with the upper end of the shaft 36, and has an integral lug formed upon its upper face in order that the same may be operated by a wrench; and tension upon the spring 34 may be increased or decreased by rotating the cap 37 upon its threaded shaft. The lower portion of the shaft 36 is bent laterally and is curved, as at 39, to form a pocket in which the rounded end 28 of the spring 12 is seated. The laterally projecting portion of the shaft 36 extends along the under face of the spring 12, as at 40, and this portion 40 is clamped to the spring 12 by a U-shaped bracket 41 and bolt 42.

The operation of my device, so far described, will be more or less obvious from the above description when read in connection with the drawing, and it will be seen that by providing the type of shock absorber and stabilizer, herein described, I am able to utilize the elements 17 and 18 which are part of the standard equipment of the Ford car and need add to these standard elements only the relatively few new parts above described. Furthermore, it will be seen that when one end of the shackle 18 is connected to the bracket 19 and the other end is connected to the spring 12, that the outer end of this shackle will be spaced away from the end of the spring 12 a sufficient distance to permit the same to assume a horizontal position, and that the coiled spring 34 and shaft 36 will normally support the outer end of the spring 12 in substantially the horizontal plane of the shackle 18, it being apparent that the tension of the spring 34 may be adjusted by screwing the cap 37 up or down upon its threaded shaft. When the automobile upon which my shock absorber is mounted is submitted to a shock by striking a rough place in the road or the like, the momentary increase in load upon the spring 12 will cause the shackle 18 to swing downwardly towards a vertical position and will thereby shift the weight of the spring 12 from the coiled spring 34 to the shackle 18. In this manner, it will be seen that my shock absorber cannot be injured by overloading the same, as the excess load upon my device will be automatically carried by the shackle 18. It should also be noted that I have so constructed the bracket 19 that the inner end of the same lies over the end of the leaf spring 12 and thereby provide an abutment against which the spring 12 strikes to reduce the rebound or upward movement of the same.

The shock absorber 16 mounted upon the rear axle differs from the shock absorber 15 in that it is provided with a bracket 43 which is bolted direct to the brake band housing 44 formed upon the rear axle 11. This rear bracket 43 is provided with a drill hole 45 adapted to receive the bolt 46, which extends through the same and through a drill hole which is provided in the housing 44, as the same is delivered from the factory, and the bolt 46 has a nut 47 threaded upon the inner end of the same. In order to secure the bracket 43 to the housing 44, all that is necessary is to remove the bracket which is provided for supporting an end of the spring 13 and substitute the bracket 43 in place thereof. The bracket 43 is provided with a drill hole 46, adapted to receive the bolt 27 of the shackle 18 in the manner above described, and the bolt 27 is lubricated by means of the oil cup 48. The bracket 43 is provided with a cup shaped portion 49 having an opening 50 formed in the bottom of the same, as in the bracket 19. In this cup member 49 is seated the coiled spring 34, above described, and a threaded shaft 34 extends through the same, as in the shock absorber 15. The shock absorber 16, as above stated, operates the same as the shock absorber 15, and differs therefrom only in the construction of the bracket. It will be apparent that if it should be desired to avoid the means herein disclosed for clamping the bracket 19 to the perch 17, these two elements may be made integral, or in other words, the bracket 19 may be provided with a downwardly projecting bolt adapted to extend through the axle 10 and secured thereto in the manner in which the perch 17 is secured to the same.

When an automobile is equipped with the combined shock absorber and stabilizer, herein described, having the same mounted upon the front and rear axles, the shock absorbers should be adjusted by means of the threaded cap 37 so that the shackle 18 upon the front and rear axles will normally be supported in substantially a horizontal plane. If the load upon the automobile is increased, the coiled springs 34 will be slightly compressed, thereby permitting the ends of the springs 12 and 13 to move downwardly slightly, as shown in dotted position in Figs. 1 and 5. At the same time the upper end of the shock absorbers will be tilted inwardly, as indicated in dotted lines in these two figures, and the load will be gradually shifted from the shock absorber to the shackle 18, as above pointed out.

It is important to note that the snubbing or stopping of the rebound is produced not only by the ends of the springs striking against the under face of the brackets, but is very largely due to the fact that the horizontal position of the shackles retain the ends of the springs a fixed distance apart and thereby prevent the leaf springs from bowing or bending in an upward direction after the ends of the springs 12 and 13 abut against the over-hanging brackets. If the shackles 18 did not lie substantially in alignment with the longitudinal axis of the springs 12 and 13 at the instant the ends of these springs abut against the under face of the brackets 19, 43, the rebound of the springs would not be materially checked, since the springs would simply bow upwardly to a considerable extent.

Although I have illustrated my invention as applied to a Ford automobile, I desire to have it understood that I do not regard my invention as being limited in its use to this particular type of automobile. Furthermore, I have not attempted to describe the modifications of the construction which may be adapted without departing from the scope of the invention, as defined in the annexed claims.

What I claim is:

1. In combination with an axle, a leaf spring, means for swingingly supporting the ends of said spring from the axle, comprising brackets mounted upon said axle, shackles connecting the ends of said spring to said brackets, said shackles connected to the spring and brackets to normally lie in substantially a horizontal plane, and resilient means supported by said brackets above said shackles for normally retaining said shackles in substantially a horizontal position.

2. In combination with an axle, a leaf spring, brackets upon said axle, shackles for connecting the ends of said spring to said brackets, said shackles connected to the spring and brackets to normally lie in substantially a horizontal plane, and resilient means mounted upon said brackets above said shackles for normally supporting said shackles in substantially a horizontal plane but permitting said shackles to swing downwardly toward a vertical position as the load upon said leaf spring increases, whereby an abnormal load upon said leaf spring is shifted from said resilient means to said shackles.

3. In combination with an axle, a leaf spring, spaced brackets carried by said axle, shackles for swingingly connecting the ends of said spring to said brackets, said brackets having portions positioned to overlie and to be engaged by the ends of said spring to form abutments against which the ends of said spring strike, said shackles arranged to lie in a position extending beyond the ends of said spring and in axial alignment therewith at the instant said spring engages said portions, to thereby reduce the rebounding action of said spring, and resilient means for normally supporting the spring engaging end of said shackles in elevated position.

4. In combination with an axle, a leaf spring, spaced brackets mounted upon said axle, shackles for swingingly connecting the ends of said spring to said brackets, and resilient means supported by said brackets, for normally supporting the ends of said spring in a raised position with the shackles lying in substantially a horizontal plane, said shackles constructed to swing downwardly to substantially a vertical position as the weight upon said leaf spring increases, whereby the increase in weight is shifted from said resilient means to said shackles.

5. In combination with an axle, a leaf spring, spaced brackets upon said axle, and shackles for swingingly connecting the ends of said spring to said brackets, said shackles being pivotally connected to said brackets beyond the ends of said spring, whereby said shackles will lie in substantially a horizontal plane, spring shock absorbers adjacent said brackets for normally supporting the ends of said spring in substantially the horizontal plane of said shackles, and means for adjusting the tension of said shock absorber spring.

6. In a shock absorber for an automobile or the like, a supporting bracket having a seat formed therein, a coiled spring mounted upon said seat, a threaded shaft extending through said bracket and coiled spring, an adjustable cap for the upper end of said coiled spring having threaded engagement with said shaft, said shaft having its lower portion bent laterally to form a seat for one end of a leaf spring and having an end secured to an intermediate portion of said leaf spring.

7. In combination with an axle, a leaf spring, brackets carried by said axle, shackles directly connecting the ends of said spring to said brackets, said shackles arranged to lie normally in substantially the horizontal plane of the ends of said springs and to swing downwardly to approximately a vertical position as the load upon said spring increases, and springs for normally supporting said shackles in the first mentioned position.

8. In combination with an axle, a leaf spring, a bracket carried by said axle, a shackle connecting the end of said spring to said bracket, said shackle arranged to swing from a horizontal to substantially a vertical position, and resilient means for normally supporting said shackle in substantially a horizontal position but constructed to permit abnormal loads to be supported by said shackle as the latter moves towards said vertical position.

9. A combined shock absorber and stabilizer for supporting one end of a leaf spring above its axle, including a bracket positioned above said axle and supported thereby, a shackle directly connecting an end of said spring to said bracket with the shackle extending beyond the end of said spring in substantial alignment therewith, a shock absorbing spring carried by said bracket, and means carried by said shock absorber spring constructed to normally support the end of said leaf spring in substantial alignment with the extended shackle.

10. In combination with an axle, a leaf spring, means for attaching the spring to said axle, comprising brackets secured to said axle in spaced relation, and shackles for movably connecting the ends of said leaf spring to said brackets, said brackets spaced from the ends of said spring a sufficient distance to permit said shackles to normally lie in substantially a horizontal plane, whereby said spring is prevented from swaying back and forth lengthwise of said axle, and resilient means carried by said brackets for normally supporting said shackles in a substantially horizontal position.

11. In combination with a leaf spring for automobiles or the like, a pair of spaced brackets, shackles for connecting the ends of said spring to said brackets and arranged to swing from a horizontal to substantially a vertical position, said shackles also arranged to normally lie in substantially a horizontal plane to check all upward rebounding movement of said spring by retaining the ends of said spring a fixed distance apart, and resilient means for normally supporting said shackles in said substantially horizontal position.

12. In combination with an axle, a leaf spring, brackets carried by said axle, shackles connecting the ends of said spring to said brackets, said shackles arranged to normally lie in longitudinal alignment with said spring between the ends of the same and said brackets, to thereby check upward rebounding movement of said spring by retaining the ends of said spring a predetermined distance apart, and resilient means for normally supporting said shackles in said longitudinal alignment, said shackles arranged to swing downwardly to substantially a vertical position as the load becomes abnormal.

In witness whereof, I have hereunto set my hand on the 10th day of December, 1918.

THOMAS C. LUCE.